United States Patent
Sa et al.

(10) Patent No.: US 8,471,940 B2
(45) Date of Patent: Jun. 25, 2013

(54) PIXEL, PIXEL ARRAY, IMAGE SENSOR INCLUDING THE SAME AND METHOD FOR OPERATING THE IMAGE SENSOR

(75) Inventors: Seung Hoon Sa, Seoul (KR); Woon Il Choi, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 251 days.

(21) Appl. No.: 13/097,732

(22) Filed: Apr. 29, 2011

(65) Prior Publication Data
US 2012/0262616 A1    Oct. 18, 2012

(30) Foreign Application Priority Data

Apr. 14, 2011    (KR) ................. 10-2011-0034806

(51) Int. Cl.
*H04N 5/335*    (2011.01)
(52) U.S. Cl.
USPC ..................... 348/308; 348/229.1
(58) Field of Classification Search
USPC ................ 348/308, 229.1; 250/208.1
See application file for complete search history.

(56) References Cited

U.S. PATENT DOCUMENTS

| 7,235,772 B2 | 6/2007 | Ko et al. |
| 7,531,858 B2 | 5/2009 | Lee |
| 8,345,136 B2 | 1/2013 | Song et al. |
| 2008/0012973 A1 | 1/2008 | Park et al. |
| 2008/0231737 A1* | 9/2008 | Weale et al. ........... 348/308 |
| 2012/0126097 A1* | 5/2012 | Kishi ................. 250/208.1 |

FOREIGN PATENT DOCUMENTS

| KR | 10-2004-0093947 A | 11/2004 |
| KR | 10-2006-0133736 A | 12/2006 |
| KR | 10-0782308 B1 | 12/2007 |
| KR | 10-2009-0012837 A | 2/2009 |

OTHER PUBLICATIONS

Notice of Allowance dated Jan. 16, 2013 in Korean Application No. 10-2011-0034806, filed Apr. 14, 2011.
Office Action dated Jul. 12, 2012 in Korean Application No. 10-2011-0034806, filed Apr. 14, 2011.

* cited by examiner

*Primary Examiner* — Tuan Ho
(74) *Attorney, Agent, or Firm* — Saliwanchik, Lloyd & Eisenschenk

(57) ABSTRACT

Disclosed are a pixel, a pixel array, an image sensor and a method for operating the image sensor. The pixel includes a photo-electro conversion unit; a first charge storage unit for storing charges converted by the photo-electro conversion unit; a first switching unit for transferring the charges from the photo-electro conversion unit to the first charge storage unit; a second charge storage unit for storing the charges converted by the photo-electro conversion unit; a second switching unit for transferring the charges from the photo-electro conversion unit to the second charge storage unit; a third switching unit for connecting the second charge storage unit with the first charge storage unit; and an output unit for outputting information about quantity of the charges stored in the first and second charge storage units. The light having the high intensity of illumination or the low intensity of illumination is sensed in the wide range.

19 Claims, 4 Drawing Sheets

PIXEL, PIXEL ARRAY, IMAGE SENSOR INCLUDING THE SAME AND METHOD FOR OPERATING THE IMAGE SENSOR

CROSS-REFERENCE TO RELATED APPLICATION

This application claims the benefit under 35 U.S.C. §119 of Korean Patent Application No. 10-2011-0034806, filed on Apr. 14, 2011, which is hereby incorporated by reference in its entirety.

TECHNICAL FIELD

The embodiment relates to a pixel, a pixel array, an image sensor including the same and a method for operating the image sensor.

BACKGROUND ART

A dynamic range is one of important factors to determine the quality of an image sensor. In general, the dynamic range refers to the maximum range for processing signals without distorting input signals. In the case of the image sensor, images having the superior quality can be obtained as the dynamic range becomes widened regardless of the brightness variation.

However, according to the color image sensor of the related art, the dynamic range is so narrow that the original color of the image may not be expressed well when one of red, green and blue colors is saturated. In order to solve the problem caused by the narrow dynamic range, a WDR (wide dynamic range) pixel has been suggested.

For instance, there has been suggested a method of realizing the WDR operation by adjusting irradiation time of the light in the image sensor of the related art.

In addition, there has been suggested a method of providing an additional capacitor to change FD (floating diffusion) capacity, in which a pixel structure includes a transistor to adjust the additional capacitor so that overflow charges, which are generated from a PD (photodiode) under the high intensity of illumination as light intensity is increased, can be stored in the additional capacitor.

Further, there has been suggested a method of providing a WDR pixel, in which two PDs are installed in one pixel such that charges generated from the two PDs are combined with each other.

However, according to the above methods, the sensitivity is constant regardless of the variation of light intensity (that is, high intensity of illumination and low intensity of illumination), so that the image may be darkened under the low intensity of illumination. In addition, while the pixel is being operated, the timing adjustment for the pixel operation under the high intensity of illumination may be limited.

Further, in the case of the method for improving the sensitivity according to the light intensity by using the additional capacitor and the transistor and the method for driving two PDs installed in one pixel, the fill factor in the pixel may be reduced.

DISCLOSURE

Technical Problem

The embodiment provides a pixel, a pixel array, an image sensor including the same and a method for operating the image sensor, in which photo charges converted under the high intensity of illumination can be sensed by combining a sub-charge storage unit and a main charge storage unit so that light having the high intensity of illumination can be sensed, thereby improving the sensitivity while maintaining the high fill factor.

Technical Solution

A pixel according to the embodiment may include a photo-electro conversion unit; a first charge storage unit for storing charges converted by the photo-electro conversion unit; a first switching unit for transferring the charges from the photo-electro conversion unit to the first charge storage unit; a second charge storage unit for storing the charges converted by the photo-electro conversion unit; a second switching unit for transferring the charges from the photo-electro conversion unit to the second charge storage unit; a third switching unit for connecting the second charge storage unit with the first charge storage unit; and an output unit for outputting information about quantity of the charges stored in the first and second charge storage units.

A pixel array according to the embodiment may include the pixel according to the embodiment.

An image sensor according to the embodiment may include the pixel array according to the embodiment.

According to the embodiment, a method for operating an image sensor is provided, in which the image sensor includes a photo-electro conversion unit, a first charge storage unit for storing charges converted by the photo-electro conversion unit, a first switching unit for transferring the charges from the photo-electro conversion unit to the first charge storage unit, a second charge storage unit for storing the charges converted by the photo-electro conversion unit, a second switching unit for transferring the charges from the photo-electro conversion unit to the second charge storage unit, a third switching unit for connecting the second charge storage unit with the first charge storage unit, and an output unit for outputting information about quantity of the charges stored in the first and second charge storage units, and the method includes the step of controlling the first switching unit to transfer the charges converted by the photo-electro conversion unit to the first charge storage unit based on an operational voltage, in which at least one operational voltage is present in a range between an ON voltage and an OFF voltage.

The embodiment can provide a pixel capable of improving the sensitivity while maintaining the high fill factor, a pixel array, an image sensor including the same and a method for operating the image sensor.

DETAILED DESCRIPTION

Figure 1:
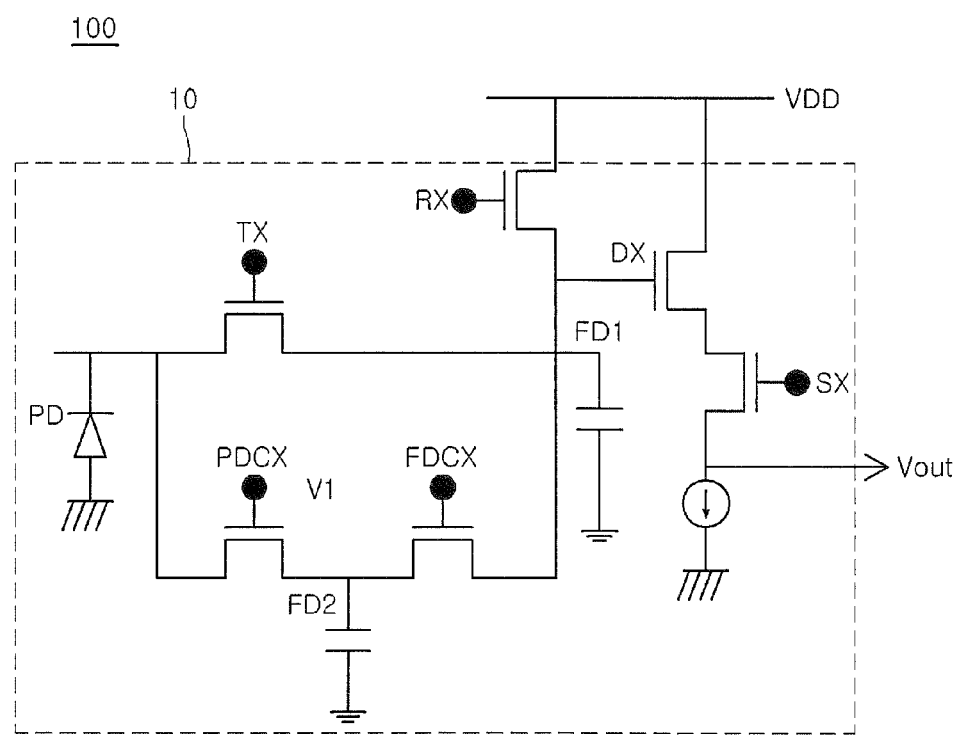
FIG. 1 is a circuit view of a pixel array according to one embodiment.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

FIG. 1 is a circuit view of a pixel array according to one embodiment. Although the pixel array 100 including a unit pixel circuit 10 and a power supply VDD is illustrated in FIG. 1, the pixel array of the embodiment may have a plurality of pixels. In FIG. 1, the unit pixel 10 will be explained as an example.

The embodiment is applicable for a WDR (wide dynamic range) pixel, a pixel array and an image sensor including the pixel array, but the embodiment is not limited thereto.

Referring to FIG. 1, the pixel array 100 of the embodiment includes a photo-electro conversion unit PD, a transfer switching unit TX for transferring charges converted by the photo-electro conversion unit PD to a charge storage unit FD1, a distribution switching unit PDCX for transferring the charges from the photo-electro conversion unit PD to a charge storage unit FD2, and a connection switching unit FDCX for connecting the two charge storage units FD1 and FD2 to each other. In addition, the pixel electrode 100 may include a reset switching unit RX for removing charges stored in the charge storage units FD1 and FD2, and an output unit for outputting information about quantity of charges stored in at least one of the charge storage units FD1 and FD2. The output unit may include at least one of a drive switching unit DX, a select switching unit SX and an output voltage terminal Vout shown in FIG. 1.

The switching units TX, PDCX, RX, FDCX, DX and SX shown in FIG. 1 may be prepared as CMOS transistors and the charge storage units FD1 and FD2 may be prepared as capacitors. In addition, the pixel array 100 may include a power supply VDD. If a plurality of pixel circuits exit, the pixel circuits may share the power supply VDD.

According to the embodiment shown in FIG. 1, the pixel array 100 includes the sub-charge storage unit FD2 in addition to the main charge storage unit FD1 generally provided in a 4T image sensor. Thus, when the capacity of the main charge storage unit FD1 is insufficient due to the incidence of light having the high intensity of illumination, the capacity of the sub-charge storage unit FD2 is combined with the capacity of the main charge storage unit FD1, so that the light having the high intensity of illumination can be sensed in a wide range. This operation will be described later in detail.

The photo-electro conversion unit PD receives the light and converts the light into charges to store the charges therein. The photo-electro conversion unit PD may be prepared as a photodiode. Since the photo-electro conversion unit PD has a limited charge storage capacity, if the quantity of charges converted from the light having the high intensity of illumination excesses the charge storage capacity of the photo-electro conversion unit PD, the light may be leaked to the charge storage units FD1 and FD2 or other regions even if the transfer switching unit TX and the distribution switching unit PDCX are turned off. Thus, the light according to the overflow charge may not be sensed under the high intensity of illumination.

The distribution switching unit PDCX can transmit the charges stored in the photo-electro conversion unit PD to the sub-charge storage unit FD2 in response to the distribution control signal. If the distribution switching unit PDCX is the CMOS transistor, the distribution control signal may be an operational voltage V1 applied to a gate. The operational voltage V1 has a voltage value having the range between an ON voltage and an OFF voltage according to the characteristic of the transistor.

For instance, if the ON voltage of the distribution switching unit PDCX is 3V and the OFF voltage of the distribution switching unit PDCX is 0V, the distribution switching unit PDCX can be operated if the operational voltage of 1.5V is applied to the distribution switching unit PDCX. If the operational voltage V1 of 1.5V is applied to the distribution switching unit PDCX in a state that the charges are excessively stored over the storage capacity of the photo-electro conversion unit PD due to the incidence of the light having the high intensity of illumination, a part of the charges stored in the photo-electro conversion unit PD can be stored in the sub-charge storage unit FD2 through the distribution switching unit PDCX. If the operational voltage V1 of the distribution switching unit PDCX is set closely to the ON voltage, the charges approximate to the total charges stored in the photo-electro conversion unit PD can be stored in the sub-charge storage unit FD2. Therefore, when the light having the high intensity or the middle intensity of illumination is stored in the photo-electro conversion unit PD, if the operational voltage V1 of the distribution switching unit PDCX is set to the lower level, the charges stored in the photo-electro conversion unit PD may not be transferred to the sub-charge storage unit FD2.

The sub-charge storage unit FD2 may be prepared as a capacitor having one end connected between the distribution switching unit PDCX and the connection switching unit FDCX, and the other end connected to a ground voltage terminal. As the operational voltage V1 is applied to the distribution switching unit PDCX, the charges accumulated in the photo-electro conversion unit PD can be stored in the sub-charge storage unit FD2. In addition, even if the OFF voltage is applied to the distribution switching unit PDCX, if the leakage current flows into the sub-charge storage unit FD2 from the photo-electro conversion unit PD due to the incidence of the light having the high intensity of illumination, the charges can be stored in the sub-charge storage unit FD2.

Meanwhile, since the sub-charge storage unit FD2 has the function of supplementing the charge capacity of the main charge storage unit FD1, the capacitance of the sub-charge storage unit FD2 is higher than or equal to the capacitance of the main charge storage unit FD1.

The transfer switching unit TX transmits the charges stored in the photo-electro conversion unit PD to the main charge storage unit FD1 in response to the transfer control signal. If the transfer switching unit TX is a CMOS transistor, the transfer control signal is a voltage applied to a gate.

The main charge storage unit FD1 may be prepared as a capacitor having one end connected to the transfer switching unit TX and the other end connected to a ground voltage terminal. In addition, the main charge storage unit FD1 may be reset by the reset switching unit RX. In addition, one end of the main charge storage unit FD1 is connected to the connection switching unit FDCX such that the main charge storage unit FD1 can be connected to the sub-charge storage unit FD2 when the connection switching unit FDCX is operated. As the main charge storage unit FD1 is connected to the sub-charge storage unit FD2, the main charge storage unit FD1 and the sub-charge storage unit FD2 may operate as the charge storage unit including two capacitors.

The connection switching unit FDCX is disposed between the main charge storage unit FD1 and the sub-charge storage unit FD2 to connect/disconnect the main charge storage unit FD1 and the sub-charge storage unit FD2 to/from each other. The main charge storage unit FD1 and the sub-charge storage unit FD2 are connected to each other as the ON voltage is applied to the gate of the connection switching unit FDCX. In this case, capacitance of the main charge storage unit FD1 is combined with the capacitance of the sub-charge storage unit FD2.

Meanwhile, if the output voltage Vout is read out when the main charge storage unit FD1 is connected to the sub-charge storage unit FD2, the quantity of the charges stored in the main charge storage unit FD1 and the sub-charge storage unit FD2 is acquired as the output value.

In addition, if the OFF voltage is applied to the connection switching unit FDCX, the main charge storage unit FD1 is disconnected from the sub-charge storage unit FD2. In this case, the connection switching unit FDCX may serve as a barrier. In addition, if the output voltage Vout is read out when the main charge storage unit FD1 is disconnected from the sub-charge storage unit FD2, the quantity of the charges stored in the main charge storage unit FD1 is acquired as the output value.

When the reset control signal is applied to the gate, the reset switching unit RX controls the photo charges stored in at least one of the main charge storage unit FD1 and the sub-charge storage unit FD2 in response to the reset control signal.

In detail, if the reset switching unit RX is operated when the main charge storage unit FD1 is connected to the sub-charge storage unit FD2 according to the ON operation of the connection switching unit FDCX, the charges stored in the main charge storage unit FD1 and the sub-charge storage unit FD2 may be removed. In addition, if the reset switching unit RX is operated when the main charge storage unit FD1 is disconnected from the sub-charge storage unit FD2 according to the OFF operation of the connection switching unit FDCX, the charges stored only in the main charge storage unit FD1 may be removed.

The drive switching unit DX transfers the charges stored in at least one of the main charge storage unit FD1 and the sub-charge storage unit FD2 to the output terminal Vout in response to the operation of the select switching unit SX. The drive switching unit DX may serve as an amplifier, such as a source follower.

The pixel 10 and the pixel array 100 according to one embodiment shown in FIG. 1 have been described above.

Figure 2:
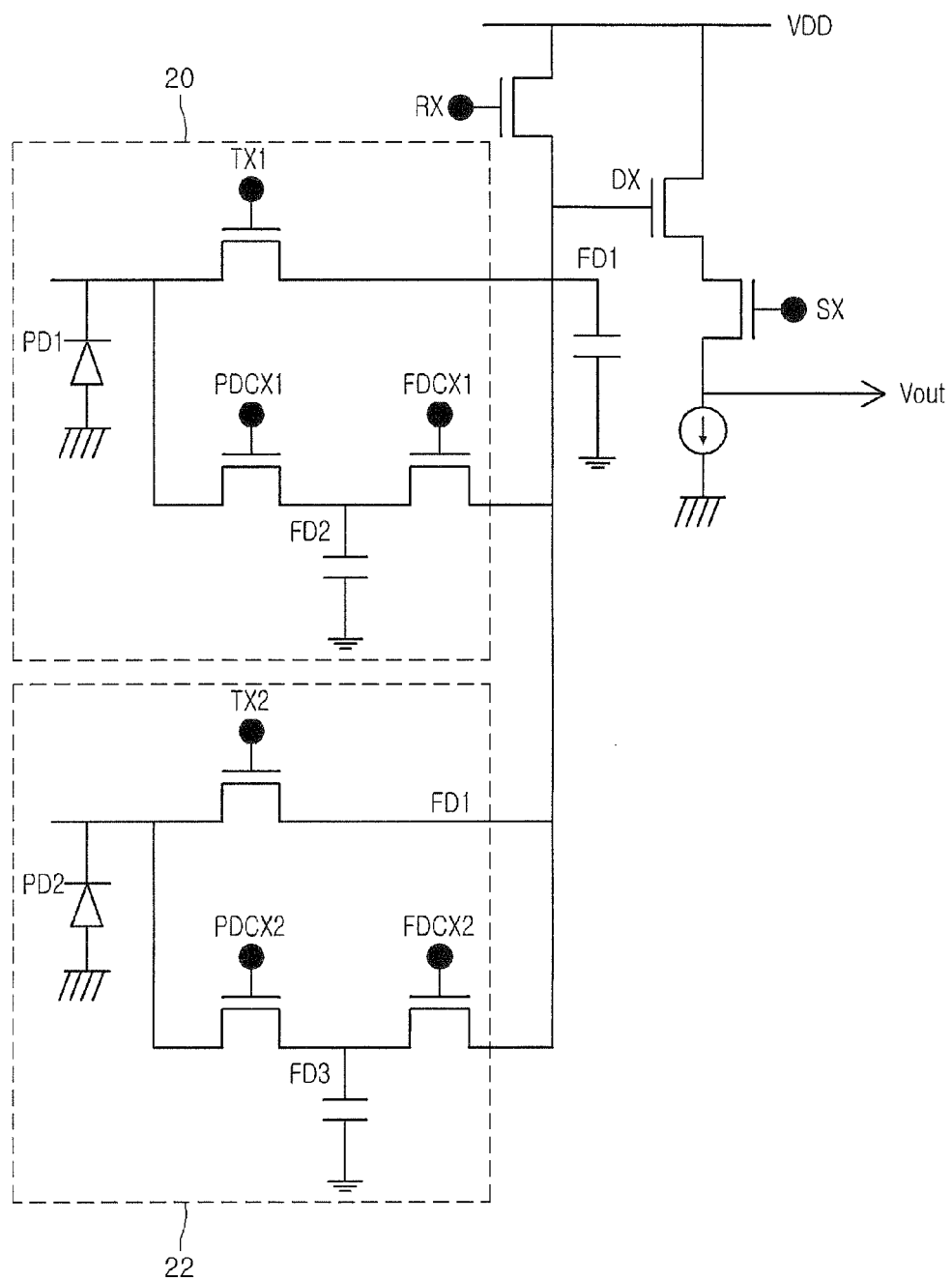
FIG. 2 is a circuit view of a pixel array according to another embodiment.

FIG. 2 is a circuit view of a pixel array 200 according to another embodiment. Referring to FIG. 2, the pixel array 200 includes the power supply VDD, the reset switching unit RX, the main charge storage unit FD1, the drive switching unit DX, the select switching unit SX and the output terminal Vout, which are the same as those shown in FIG. 1. In addition, the pixel array 200 includes one distribution circuit 20 consisting of a photo-electro conversion unit PD1, a transfer switching unit TX1, a distribution switching unit PDCX1, a sub-charge storage unit FD2, and a connection switching unit FDCX1 and the other distribution circuit 22 the same as the distribution circuit 20. That is, two distribution circuits 20 and 22 include the photo-electro conversion units PD1 and PD2 and charge storage units FD2 and FD3, respectively, while sharing the main charge storage unit FD1, the power supply VDD and the output unit. Since plural distribution circuits can share the devices, the installation area for the devices can be reduced so that the integration degree of the apparatus can be improved. Although FIG. 2 shows two distribution circuits, the embodiment is not limited thereto. For instance, at least three distribution circuits may share the main charge storage unit FD1, the power supply VDD and the output unit.

Figure 3:
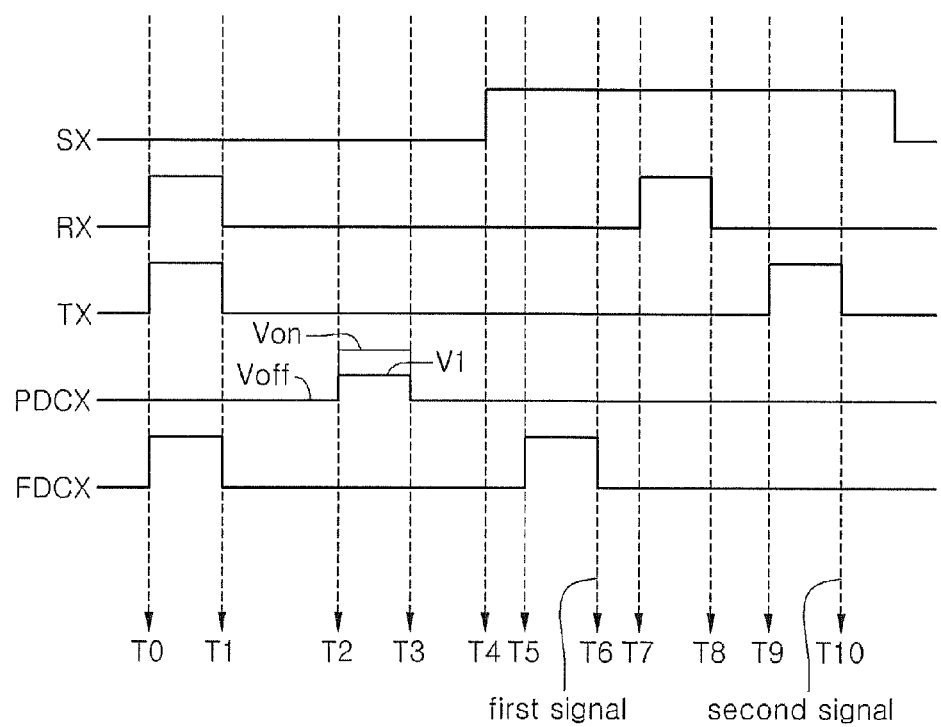
FIG. 3 is a timing diagram obtained from a circuit of a pixel array according to the embodiment.

FIG. 3 is a timing diagram obtained from a circuit of the pixel array according to the embodiment shown in FIG. 1.

In timing T0, the transfer switching unit TX and the connection switching unit FDCX are operated to transfer the charges stored in the photo-electro conversion unit PD to the charge storage units FD1 and FD2. At the same time or after that, the reset switching unit RX is operated, so that the charges stored in the charge storage units FD1 and FD2 are completely removed. That is, during the interval T0 to T1, the charges stored in the photo-electro conversion unit PD and the charge storage units FD1 and FD2 are completely removed, so that the pixel array is initialized.

Next, in timing T1, the transfer switching unit TX and the connection switching unit FDCX are turned off, so that the photo charges are stored in the photo-electro conversion unit PD. The quantity of charges stored in the photo-electro conversion unit PD may vary depending on the exposure time of the photo-electro conversion unit PD and the intensity of illumination of the light.

Then, in timing T2, the distribution switching unit PDCX is operated. In detail, a predetermined operational voltage V1 is applied to the gate of the distribution switching unit PDCX to operate the distribution switching unit PDCX. As the distribution switching unit PDCX is operated, a part of the charges stored in the photo-electro conversion unit PD is transferred to and stored in the sub-charge storage unit FD2 according to the intensity of the operational voltage V1. Meanwhile, if a smaller amount of charges is stored in the photo-electro conversion unit PD due to the incidence of the light having the low intensity of illumination and the operational voltage V1 of the distribution switching unit PDCX is insufficient to transfer the smaller amount of charges, the charges may not be transferred to the sub-charge storage unit FD2.

Meanwhile, after the turn off timing T1 of the transfer switching unit TX, the charges can be generated and stored in the photo-electro conversion unit PD according to the intensity of illumination of the light and the exposure time of the photo-electro conversion unit PD. If the light has the high intensity of illumination, the leakage current exceeding the charge storage capacity of the photo-electro conversion unit PD may be stored in the main charge storage unit FD1. In addition, since the charges stored in the photo-electro conversion unit PD are partially transferred to the sub-charge storage unit FD2 after the operation timing T2 of the distribution switching unit PDCX, the information about the quantity of the charges stored in the main charge storage unit FD1 may depend on the information about the quantity of the charges converted by the photo-electro conversion unit PD and the information about the quantity of the charges stored in the sub-charge storage unit FD2 after the operation timing T2 of the distribution switching unit PDCX.

After the turn off timing T3 of the distribution switching unit PDCX, the charges converted by the photo-electro conversion unit PD are stored in the photo-electro conversion unit PD or stored in the main charge storage unit FD1 due to the leakage current if the light has the high intensity of illumination.

Then, in timing T4, the select switching unit SX is operated. After that, in timing T5, the connection switching unit FDCX is operated, so that the main charge storage unit FD1 is connected to the sub-charge storage unit FD2. Thus, the value of the quantity of charges stored in the main charge storage unit FD1 and the sub-charge storage unit FD2 can be read out in the output terminal Vout after the interval T5 to T6. The value of the quantity of the charges, which is read out after the interval T5 to T6, is referred to as a first signal. That is, even if the light having the high intensity of illumination is incident, all or almost photo charges according to the high intensity of illumination can be stored in the charge storage units FD1 and FD2, so that the sensing capability for the light can be improved under the high intensity of illumination.

Then, the reset switching unit RX is operated during the interval T7 to T8, thereby completely removing the charges stored in the main charge storage unit FD1 and the sub-charge storage unit FD2. That is, the main charge storage unit FD1 is reset.

After that, the transfer switching unit TX is operated during the interval T9 to T10 to transfer the charges stored in the photo-electro conversion unit PD to the main charge storage unit FD1 after the timing T1. At this time, the information about the charges stored in the main charge storage unit FD1 can be read out in the output terminal Vout. The value of the quantity of charges, which is read out after the interval T9 to T10, is referred to as a second signal. When comparing with the first signal, the second signal has the output value caused by the light having the low intensity of illumination.

As described above, according to the embodiment, the signals are sensed twice for one period, so that the light having the high intensity of illumination can be sensed through the time-expansion scheme. In addition, since the photo charges are stored in the sub-charge storage unit FD2, the light having the high intensity of illumination can be sensed through the spatial-expansion scheme.

Figure 4:
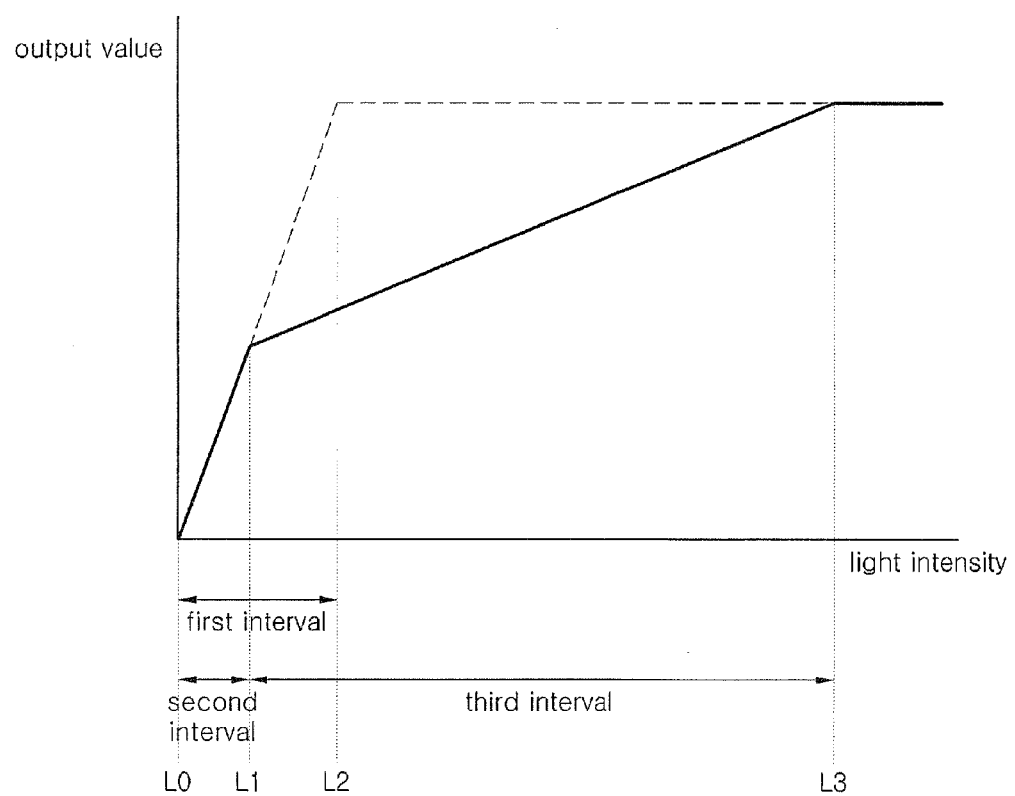
FIG. 4 is a graph showing an output value as a function of variation of intensity of light incident into an image sensor according to one embodiment.

FIG. 4 is a graph showing an output value as a function of variation of intensity of light incident into an image sensor according to one embodiment.

Referring to FIG. 4, when the light is sensed by using one charge storage unit, the output value represented by a dotted line is read out. That is, the image is sensed only in the first interval where the light has the low intensity of illumination, and the same output value is acquired if the intensity of the light exceeds a point L2 so that the image processing capability is degraded under the high intensity of illumination.

In contrast, according to the pixel array having the sub-charge storage unit of the embodiment, the light is sensed by the main charge storage unit FD1 in the second interval having the low intensity of illumination, and the light is sensed by the combination of the main charge storage unit FD1 and the sub-charge storage unit FD2 in the third interval having the middle and high intensity of illumination, so that the intensity of the sensible light may be expanded from the point L2 to the point L3.

That is, the light having the low intensity of illumination can be sensed by the main charge storage unit FD1 having the smaller capacitance and the light having the high intensity of illumination can be sensed by the combination of the main charge storage unit FD1 and the sub-charge storage unit FD2 with the expanded capacitance. Thus, the circuit can sense the light having the lower intensity of illumination as well as the light having the higher intensity of illumination. Therefore, the dynamic range of the image sensor can be widened, so that the high-quality image can be obtained regardless of the variation of the brightness.

As described above, the embodiment can provide the pixel capable of improving the sensitivity while maintaining the high fill factor, the pixel array, the image sensor including the same and the method for operating the image sensor.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A pixel comprising:
   a photo-electro conversion unit;
   a first charge storage unit for storing charges converted by the photo-electro conversion unit;
   a first switching unit for transferring the charges from the photo-electro conversion unit to the first charge storage unit;
   a second charge storage unit for storing the charges converted by the photo-electro conversion unit;
   a second switching unit for transferring the charges from the photo-electro conversion unit to the second charge storage unit;
   a third switching unit for connecting the second charge storage unit with the first charge storage unit; and
   an output unit for outputting information about quantity of the charges stored in the first and second charge storage units.

2. The pixel of claim 1, wherein at least one operational voltage is present in a range between an OFF voltage and an ON voltage to control a switching operation of the first switching unit.

3. The pixel of claim 1, wherein the first switching unit transfers a part of the charges stored in the photo-electro conversion unit to the first charge storage unit based on an intensity of an operational voltage for controlling a switching operation.

4. The pixel of claim 1, further comprising a reset switching unit for removing the charges stored in at least one of the first and second charge storage units.

5. The pixel of claim 1, wherein the output unit outputs information about the quantity of the charges stored in at least one of the first and second charge storage units after the first switching unit has been operated and outputs information about the quantity of the charges stored in the first charge storage unit after the second switching unit has been operated.

6. The pixel of claim 5, wherein the information about the quantity of charges stored in the second charge storage unit after the first switching unit has been operated depends on the quantity of the charges converted by the photo-electro conversion unit and the quantity of the charges stored in the first charge storage unit.

7. The pixel of claim 5, wherein the output unit outputs the information about the quantity of the charges, which are transferred through the second switching unit and stored in the second charge storage unit after the charges stored in the first and second charge storage units have been removed.

8. The pixel of claim 1, wherein the photo-electron conversion unit, the first charge storage unit, the first switching unit, the second switching unit and the third switching unit constitute a distribution circuit and a plurality of distribution circuits are provided while sharing the second charge storage unit and the output unit.

9. The pixel of claim 1, wherein the first and second charge storage units constitute capacitors, in which a capacitance of the first charge storage unit is higher than or equal to a capacitance of the second charge storage unit.

10. A pixel array including the pixel claimed in claim 1.

11. An image sensor including the pixel array of claim 10.

12. A method for operating an image sensor including a photo-electro conversion unit, a first charge storage unit for storing charges converted by the photo-electro conversion unit, a first switching unit for transferring the charges from the photo-electro conversion unit to the first charge storage unit, a second charge storage unit for storing the charges converted by the photo-electro conversion unit, a second switching unit for transferring the charges from the photo-electro conversion unit to the second charge storage unit, a third switching unit for connecting the second charge storage unit with the first charge storage unit, and an output unit for outputting information about quantity of the charges stored in the first and second charge storage units, the method comprising:
controlling the first switching unit to transfer the charges converted by the photo-electro conversion unit to the first charge storage unit based on an operational voltage, in which at least one operational voltage is present in a range between an ON voltage and an OFF voltage.

13. The method of claim 12, wherein the first switching unit transfers a part of the charges stored in the photo-electro conversion unit to the first charge storage unit based on an intensity of the operational voltage for controlling a switching operation.

14. The method of claim 12, the charges stored in at least one of the first and second charge storage units are removed by a reset switching unit.

15. The method of claim 12, wherein the output unit outputs information about the quantity of the charges stored in at least one of the first and second charge storage units after the first switching unit has been operated and outputs information about the quantity of the charges stored in the first charge storage unit after the second switching unit has been operated.

16. The method of claim 15, wherein the information about the quantity of charges stored in the second charge storage unit after the first switching unit has been operated depends on the quantity of the charges converted by the photo-electro conversion unit and the quantity of the charges stored in the first charge storage unit.

17. The method of claim 15, wherein the output unit outputs the information about the quantity of the charges, which are transferred through the second switching unit and stored in the second charge storage unit after the charges stored in at least one of the first and second charge storage units have been removed.

18. The method of claim 12, wherein the photo-electron conversion unit, the first charge storage unit, the first switching unit, the second switching unit and the third switching unit constitute a distribution circuit and a plurality of distribution circuits are provided while sharing the second charge storage unit and the output unit.

19. The method of claim 13, wherein the first and second charge storage units constitute capacitors, in which a capacitance of the first charge storage unit is higher than or equal to a capacitance of the second charge storage unit.

* * * * *